(12) United States Patent
Park et al.

(10) Patent No.: US 10,727,682 B2
(45) Date of Patent: Jul. 28, 2020

(54) EMERGENCY CHARGING DEVICE AND METHOD FOR DOOR LOCK

(71) Applicant: AMADAS Co., LTD., Seoul (KR)

(72) Inventors: Eun-Min Park, Seongnam-si (KR); Sang-Woo Jung, Busan (KR); Gi-Young Kim, Anyang-si (KR)

(73) Assignee: AMADAS CO., LTD. (KR)

( * ) Notice: Subject to any disclaimer, the term of this patent is extended or adjusted under 35 U.S.C. 154(b) by 186 days.

(21) Appl. No.: 16/070,519

(22) PCT Filed: Jan. 21, 2016

(86) PCT No.: PCT/KR2016/000681
§ 371 (c)(1),
(2) Date: Jul. 16, 2018

(87) PCT Pub. No.: WO2017/126722
PCT Pub. Date: Jul. 27, 2017

(65) Prior Publication Data
US 2019/0027951 A1    Jan. 24, 2019

(51) Int. Cl.
| | |
|---|---|
| *H02J 7/00* | (2006.01) |
| *E05B 1/00* | (2006.01) |
| *H02J 7/34* | (2006.01) |
| *E05B 47/00* | (2006.01) |
| *H02S 40/38* | (2014.01) |
| *H02J 7/35* | (2006.01) |

(52) U.S. Cl.
CPC ............ *H02J 7/0068* (2013.01); *E05B 1/003* (2013.01); *E05B 47/00* (2013.01); *H02J 7/342* (2020.01); *H02J 7/35* (2013.01); *H02S 40/38* (2014.12); *E05B 2047/0058* (2013.01); *E05B 2047/0064* (2013.01); *Y02E 10/50* (2013.01)

(58) Field of Classification Search
CPC .. H02J 7/0068; H02J 7/342; H02J 7/35; H02J 7/00; H02J 7/34; E05B 1/003; E05B 1/00; E05B 47/00; E05B 2047/0058; E05B 2047/0064; Y02E 10/50; H02S 40/38
See application file for complete search history.

(56) References Cited

FOREIGN PATENT DOCUMENTS

| | | |
|---|---|---|
| JP | 2009185581 A | 8/2009 |
| JP | 2010165314 A | 7/2010 |
| KR | 2003-0012704 A | 2/2003 |
| KR | 10-2005-005056 A | 1/2005 |
| KR | 10-2012-0012413 A | 2/2012 |
| KR | 10-2012-0025786 A | 3/2012 |
| KR | 10-2012-0045478 A | 5/2012 |

*Primary Examiner* — Robert L Deberadinis
(74) *Attorney, Agent, or Firm* — Goldilocks Zone IP Law

(57) ABSTRACT

The present invention relates to an emergency charging device and method for a door lock and specifically to an emergency charging device and method for a door lock, capable of: charging a secondary battery by means of light or a battery in a regular charging mode in which the battery is not discharged and, at the same time, operating the door lock by means of the battery or the secondary battery according to the amount of charge; and operating the door lock in an emergency manner by urgently charging the secondary battery by means of light in an emergency charging mode in which the battery is discharged.

9 Claims, 4 Drawing Sheets

EMERGENCY CHARGING DEVICE AND METHOD FOR DOOR LOCK

CROSS REFERENCE TO RELATED PATENT APPLICATION

This application claims the benefit under 35 U.S.C. Section 371, of PCT International Application No. PCT/KR2016/000681, Jan. 21, 2016 filed, the disclosure of which are hereby incorporated by the references.

TECHNICAL FIELD

The present disclosure relates to an emergency charging device and method for a door lock, and more particularly, to an emergency charging device and method for a door lock, which is capable of charging a secondary battery by means of light or a battery in a regular charging mode in which the battery is not discharged, and at the same time, operating the door lock by means of the battery or the secondary battery according to the amount of charge, and operating the door lock in an emergency manner by urgently charging the secondary battery by means of light in an emergency charging mode in which the battery is discharged.

BACKGROUND ART

In the case of a mechanical door lock, there is inconvenience of having to carry a key, and thus, in recent years, electrically actuated door locks which can open doors by inputting passwords or fingerprints are widely used.

Most of the electrically actuated door locks is operated by using a battery. Therefore, if a user does not recognize battery discharge in advance, and the battery is discharged, the operation of the door lock may be stopped, and the user may encounter a situation in which the door cannot be opened.

To solve this problem, a product having a battery terminal exposed on the outside of a door lock has been released. In the case of the door lock having the battery terminal exposed, the problem of the operation stop caused by the battery discharge can be solved, but users should always carry other batteries in case the battery is discharged, which may cause inconvenience.

Korean Patent Registration No. 1096915 discloses an electrically actuated door lock provided with its own charging unit which is capable of charging a battery by rotating a handle of the door lock. However, the related-art door lock has a complicated structure due to a power generation device using a rotational force of the handle, and there is inconvenience that a user should directly rotate the handle.

DISCLOSURE

Technical Problems

The present disclosure has been developed to solve the above-mentioned problems, and an object of the present disclosure is to provide an emergency charging device for a door lock, which can charge a battery in a simple and easy method when the battery of the door lock is discharged, and can operate the door lock.

Another object of the present disclosure is to provide an emergency charging device for a door lock, which can delay electric discharge of a battery of the door lock by using electric energy stored by a regular charging operation.

Technical Solution

To achieve the objects, an emergency charging device for a door lock according to the present disclosure includes: a primary battery; a solar cell module configured to receive external light and to output a voltage; a secondary battery configured to receive the voltage outputted from the primary battery or the solar cell module, and to store an electricity; and a door lock control unit, wherein, when an amount of electricity stored in the secondary battery is greater than or equal to a set maximum amount of charge, the door lock control unit is configured to operate the secondary battery as an operating power source of the door lock, and, when the amount of electricity of the secondary battery is less than or equal to the set maximum amount of charge, the door lock control unit is configured to operate the primary battery as the operating power source of the door lock.

When the primary battery is discharged and the amount of electricity stored in the secondary battery is greater than or equal to a set minimum amount of charge, the door lock control unit may be configured to operate the secondary battery as the operating power source of the door lock.

When the primary battery is discharged and the amount of electricity stored in the secondary battery is less than or equal to a set minimum amount of charge, the door lock control unit may be configured to receive the voltage from the solar cell module, and to charge the secondary battery, and, when the amount of electricity stored in the secondary battery is greater than or equal to the set minimum amount of charge, the door lock control unit may be configured to operate the secondary battery as the operating power source of the door lock.

In addition, an emergency charging method for a door lock according to the present disclosure includes the steps of: charging a secondary battery by using an output voltage of a solar cell module in a regular charging mode in which a primary battery is not discharged; when an amount of electricity stored in the secondary battery is greater than or equal to a set maximum amount of charge, operating the secondary battery as an operating power source of the door lock; when the amount of electricity stored in the secondary battery is less than or equal to the set maximum amount of charge, operating the primary battery as the operating power source of the door lock; and, when the primary battery is not discharged and the amount of electricity stored in the secondary battery is less than or equal to a set minimum amount of charge, charging the second battery by using an output voltage of the primary battery.

Advantageous Effects

As described above, the door lock according to the present disclosure is provided with the solar cell module, and generates electricity from light from the sun or lamp and charges the secondary battery in the regular charging mode, and selectively uses the battery or the secondary battery as a power source of the door lock. Therefore, there is an effect of delaying battery discharge.

In addition, the door lock according to the present disclosure enables a user to charge the battery easily and rapidly by using light of a flashlight or a smart phone in the emergency charging mode in which the battery is discharged. Therefore, there is an effect of rapidly coping with a situation in which the operation of the door lock is stopped by battery discharge.

BEST MODE

Figure 1:
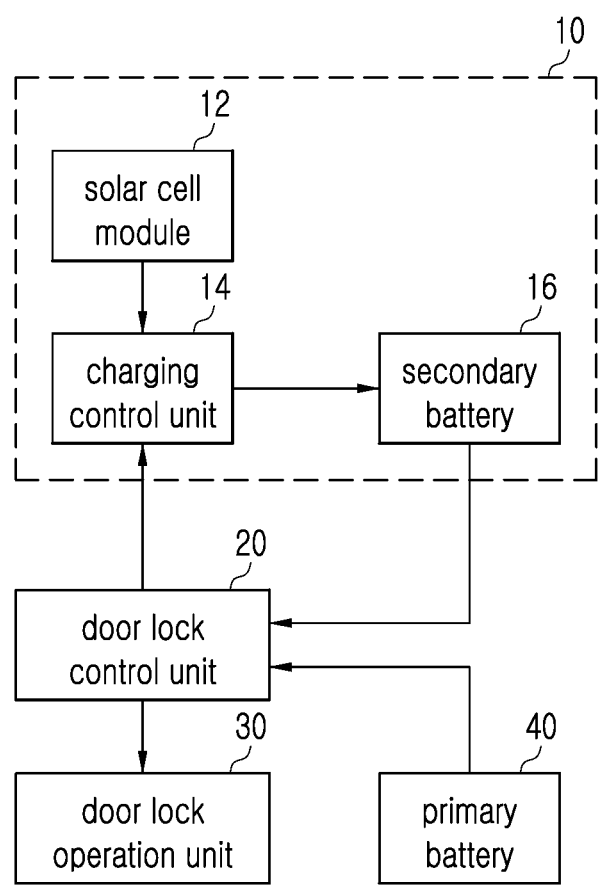
FIG. 1 is a view illustrating an inner configuration of an emergency charging device for a door lock according to the present disclosure.

Hereinafter, embodiments according to the present disclosure will be described in detail with reference to the accompanying drawings. A configuration of the present disclosure and an effect resulting therefrom will be clearly understood based on the following detailed descriptions.

In the detailed description of the present disclosure, the same reference numerals are used for the same elements even if they are represented on different drawings, and detailed descriptions of well-known configurations will be omitted since they would unnecessarily obscure the subject matters of the present disclosure.

FIG. 1 is a view illustrating a schematic inner configuration of an emergency charging device for a door lock according to the present disclosure.

Referring to FIG. 1, the emergency charging device for the door lock includes a charging unit 10, a door lock control unit 20, a door lock operation unit 30, and a primary battery 40.

Herein, the charging unit 10 includes a solar cell module 12, a charging control unit 14, and a secondary battery 16.

The solar cell module 12 includes a plurality of solar cells, and receives light generated from the sun or a lamp and outputs a predetermined voltage. The solar cell is configured as a semiconductor element to convert light energy into electric energy.

The charging control unit 14 receives a voltage supplied from the solar cell module 12 or the primary battery 40, and adjusts the voltage to a rechargeable voltage. The charging control unit 14 may control the secondary battery not to be overcharged when the secondary battery 14 is charged.

The secondary battery 16 receives the adjusted voltage from the charging control unit 14, and stores electric energy. A lithium battery, a lithium ion battery, or the like may be used as the secondary battery. In an embodiment of the present disclosure, a set minimum amount of charge of the second battery 16 is 3.0-3.4V, and a set maximum amount of charge is 3.6-4.2V.

The door lock control unit 20 is a unit for controlling the door lock operation unit 30. The door lock control unit 20 according to the present disclosure identifies an amount of electricity stored in the secondary battery 16, and controls the secondary battery 16 or the primary battery 40 to be used as a power source of the door lock, and controls a charging operation of the secondary battery 16 by using the primary battery 40.

That is, when the amount of electricity stored in the secondary battery 16 is greater than or equal to the set maximum amount of charge, the door lock control unit 20 controls the second battery 16 to be used as a power source of the door lock since the amount of electricity in the secondary battery 16 is sufficient, and, when the amount of electricity stored in the secondary battery 16 is less than or equal to the set maximum amount of charge, the door lock control unit 20 controls the primary battery 40 to be used as a power source of the door lock. In addition, when the amount of electricity stored in the secondary battery 16 is less than or equal to the set minimum amount of charge, the door lock control unit 20 controls the secondary battery 16 to be charged by using the voltage of the primary battery 40.

The door lock operation unit 30 operates the door lock to be opened or closed according to a control command of the door lock control unit 20. When a password inputted through an input unit (not shown) of the door lock is correct, the door lock control unit 20 outputs an opening command to the door lock operation unit 30, or, when it is identified that the door is closed, the door control unit 20 outputs a closing command to the door lock operation unit 30.

The primary battery 40 is a battery which is used as an operating power source of the door lock. The primary battery 40 according to the present disclosure may be used as not only the operating power source of the door lock, but also a source for charging the secondary battery 16.

The emergency charging device for the door lock according to the present disclosure operates separately in a regular charging mode in which the primary battery 40 is not discharged, and in an emergency charging mode in which the primary battery 40 is discharged, and hereinafter, an operation of the door lock according to each mode will be described.

Figure 2:
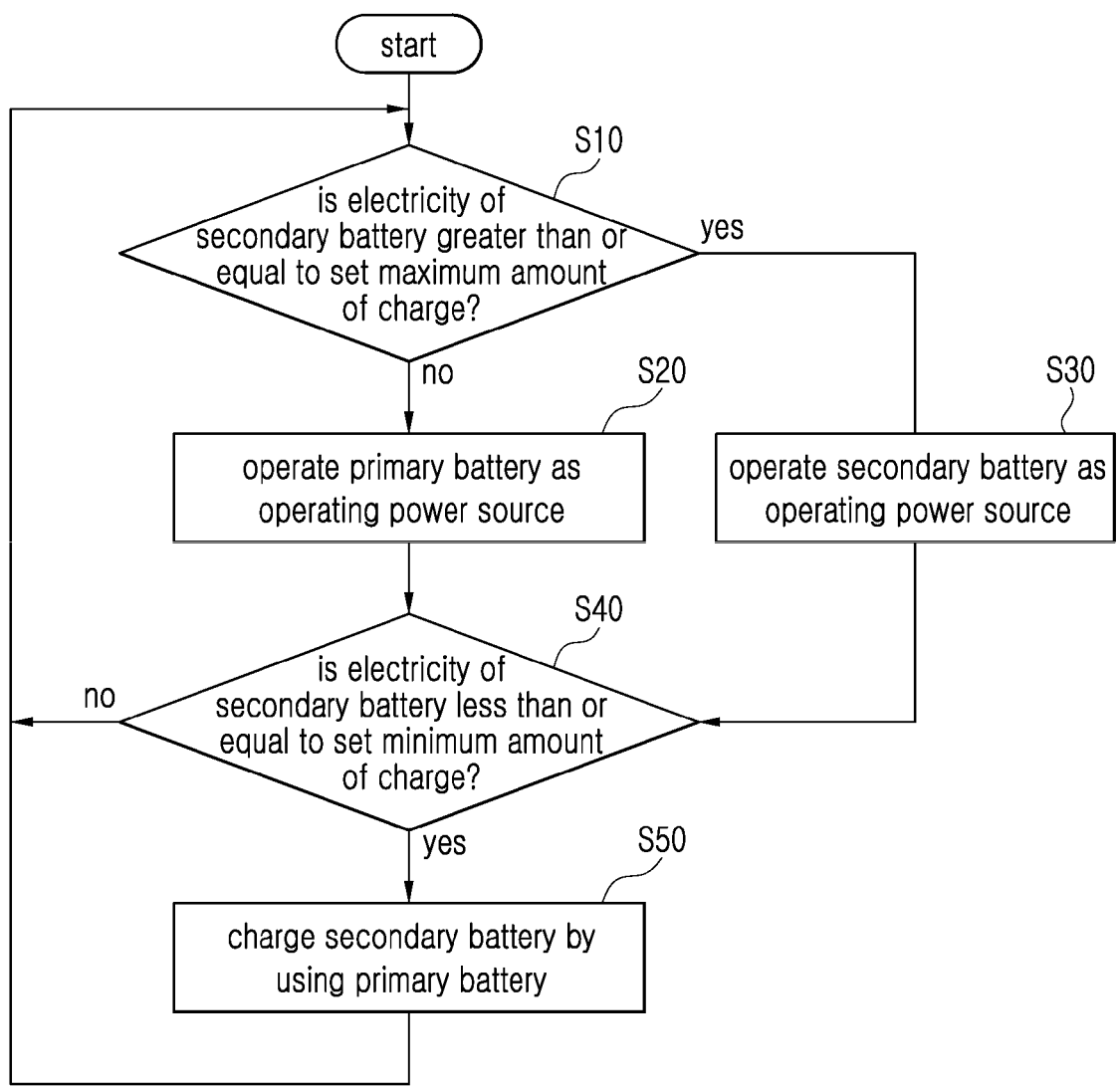
FIG. 2 is a sequence diagram illustrating an operating process in a regular charging mode of the door lock according to the present disclosure.

FIG. 2 is a view illustrating an operating process when the emergency charging device for the door lock is in the regular charging mode.

Referring to FIG. 2, the emergency charging device for the door lock may identify whether the amount of electricity stored in the secondary battery 16 is greater than or equal to the set maximum amount of charge (S10). In this case, when the emergency charging device for the door lock is in an environment in which it is exposed to sunlight or a lamp, the emergency charging device may charge the secondary battery 16 by using the solar cell module 12.

When the amount of electricity stored in the secondary battery 16 is not greater than or equal to the set maximum amount of charge, the primary battery 40 operates as the operating power source of the door lock (S20), and, when the amount of electricity stored in the secondary battery 16 is greater than or equal to the set maximum amount of charge, the secondary battery 16 operates as the power driving source of the door lock (S30).

While the primary battery 40 or the secondary battery 16 is used as the operating power source of the door lock, the emergency charging device for the door lock identifies whether the amount of electricity stored in the secondary battery 16 is less than or equal to the set minimum amount of charge (S40).

When the amount of electricity stored in the secondary battery 16 is less than or equal to the set minimum amount of charge, the emergency charging device for the door lock charges the secondary battery 16 by using the primary battery 40 (S50). When the amount of electricity stored in the secondary battery 16 is not less than or equal to the set minimum amount of charge, step S10 is resumed and the same process is performed.

Figure 3:
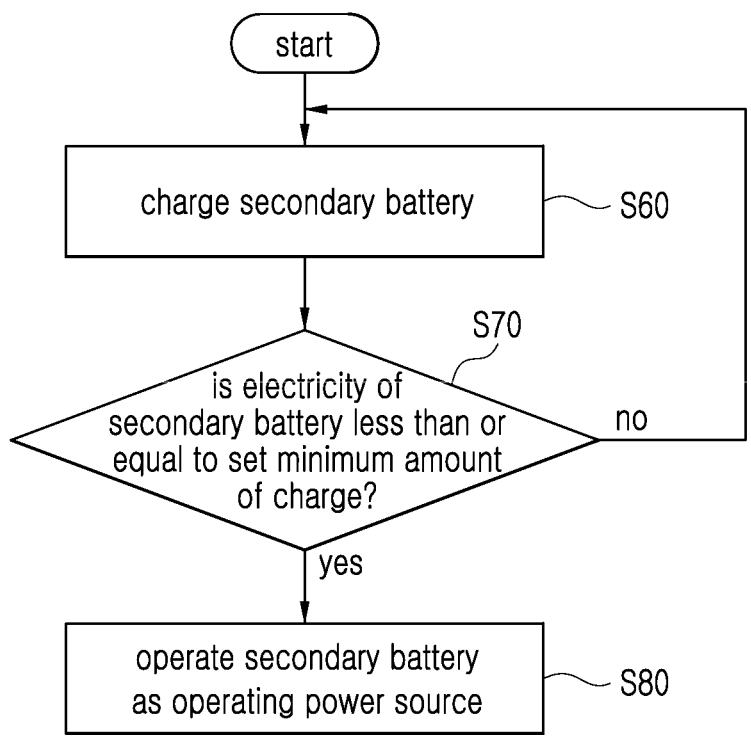
FIG. 3 is a sequence diagram illustrating an operating process in an emergency charging mode of the door lock according to the present disclosure.

FIG. 3 is a view illustrating an operating process when the emergency charging device for the door lock is in the emergency charging mode.

Referring to FIG. 3, the step of charging the secondary battery 16 (S60) is directly performed. However, when the primary battery 40 is discharged and the amount of electricity stored in the secondary battery 16 is greater than or equal to the set minimum amount of charge, the secondary battery 16 may be used as the operating power source of the door lock, and thus the process of charging the secondary battery 16 may be omitted.

When the primary battery 40 is discharged and the amount of electricity stored in the secondary battery is less than or equal to the set minimum amount of charge, the operation of the door lock is stopped. In this case, when a user flashes light of a flashlight or a smart phone on the solar cell module 12, the secondary battery 16 is charged (S60).

Figure 4:
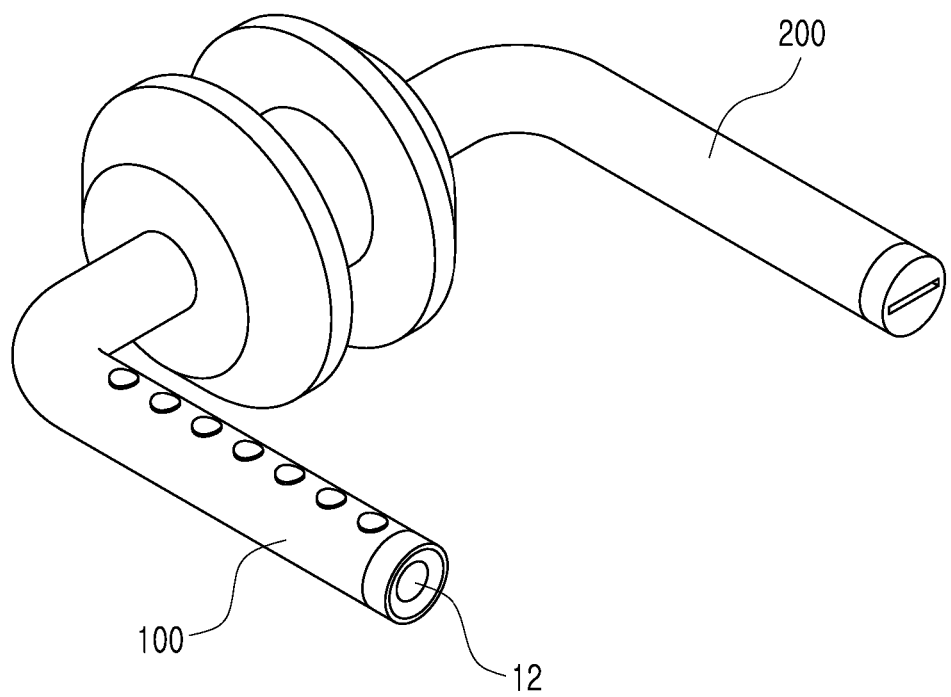
FIG. 4 is a view illustrating an embodiment of the door lock according to the present disclosure.

FIG. 4 is a view illustrating the door lock according to an embodiment of the present disclosure.

Referring to FIG. 4, the secondary battery 16 (not shown) is embedded in an external lever 100 of the door lock, and the solar cell module 12 is installed on an end of the external lever 100. The primary battery 40 (not shown) is embedded in an internal lever 200.

When the primary battery 40 of the internal lever 200 is discharged and an amount of electricity enough to operate the door lock is not charged in the secondary battery of the external lever 100, the user may flash light of a smart phone on the end of the external lever 100 to operate the door lock.

When the solar cell module 12 receives light energy and outputs a voltage as described above, the emergency charging device for the door lock charges the secondary battery 16 by using the output voltage of the solar cell module 12, and identifies whether the amount of electricity stored in the secondary battery 16 is greater than or equal to the set minimum amount of charge (S70).

When the amount of electricity stored in the secondary battery 16 is not greater than or equal to the set minimum amount of charge, the emergency charging device continues charging, and, when the amount of electricity stored in the secondary battery 16 is greater than or equal to the set minimum amount of charge, the emergency charging device controls the secondary battery 16 to be used as the operating power source of the door lock (S80).

In the embodiment of the present disclosure, the solar cell module 12 is disposed on the end of the external lever 100. However, this is merely a disposal considering a design, and the present disclosure is not limited thereto. The solar cell module 12 may be disposed on other portions of the external lever 100 or a door connection portion other than the lever.

The above description is merely an illustrative description of the present disclosure, and various changes may be made by those skilled in the art without departing from the technical concept of the present disclosure.

Therefore, embodiments disclosed in the detailed description of the present disclosure are not intended to limit the present disclosure. The scope of the present disclosure should be interpreted by the appended claims, and all technologies within the scope equivalent thereto should be interpreted as being included in the scope of the present disclosure.

INDUSTRIAL APPLICABILITY

The present disclosure relates to an emergency charging device and method for a door lock, and may be widely used in digital door lock devices.

What is claimed is:

1. An emergency charging device for a door lock, comprising:
   a solar cell module configured to receive external light and to output a voltage;
   a secondary battery configured to receive the voltage outputted from the solar cell module, and to store an electricity; and
   a door lock control unit configured to control an operation of the door lock by using electric energy supplied from the secondary battery.

2. The emergency charging device of claim 1, further comprising a primary battery,
   wherein, when an amount of electricity stored in the secondary battery is greater than or equal to a set maximum amount of charge, the door lock control unit is configured to operate the secondary battery as an operating power source of the door lock, and, when the amount of electricity of the secondary battery is less than or equal to the set maximum amount of charge, the door lock control unit is configured to operate the primary battery as the operating power source of the door lock.

3. The emergency charging device of claim 2, wherein, when the amount of electricity stored in the secondary battery is less than or equal to a set minimum amount of charge, the door lock control unit is configured to charge the secondary battery by using a voltage of the primary voltage.

4. The emergency charging device of claim 2, wherein, when the primary battery is discharged and the amount of electricity stored in the secondary battery is greater than or equal to a set minimum amount of charge, the door lock control unit is configured to operate the secondary battery as the operating power source of the door lock.

5. The emergency charging device of claim 2, wherein, when the primary battery is discharged and the amount of electricity stored in the secondary battery is less than or equal to a set minimum amount of charge, the door lock control unit is configured to receive the voltage from the solar cell module, and to charge the secondary battery, and, when the amount of electricity stored in the secondary battery is greater than or equal to the set minimum amount of charge, the door lock control unit is configured to operate the secondary battery as the operating power source of the door lock.

6. The emergency charging device of claim 2, further comprising a charging control unit configured to adjust the voltage outputted from the primary battery or the solar cell module to a rechargeable voltage, and to apply the voltage to the secondary battery.

7. An emergency charging method for a door lock, the method comprising the steps of:
   charging a secondary battery by using an output voltage of a solar cell module in a regular charging mode in which a primary battery is not discharged;
   when an amount of electricity stored in the secondary battery is greater than or equal to a set maximum amount of charge, operating the secondary battery as an operating power source of the door lock;
   when the amount of electricity stored in the secondary battery is less than or equal to the set maximum amount of charge, operating the primary battery as the operating power source of the door lock; and
   when the primary battery is not discharged and the amount of electricity stored in the secondary battery is less than or equal to a set minimum amount of charge, charging the second battery by using an output voltage of the primary battery.

8. The emergency charging method of claim 7, further comprising a step of, when the amount of electricity stored in the secondary battery is greater than or equal to the set minimum amount of charge in an emergency charging mode in which the primary battery is discharged, operating the second battery as the operating power source of the door lock.

9. The emergency charging method of claim 7, further comprising the steps of:
   when the amount of electricity stored in the secondary battery is less than or equal to the set minimum amount of charge in an emergency charging mode in which the primary battery is discharged, and there is an output voltage from the solar cell module, charging the secondary battery by using the output voltage of the solar cell module; and
   when the amount of electricity stored in the secondary battery is greater than or equal to the set minimum amount of charge, operating the secondary battery as the operating power source of the door lock.

* * * * *